(12) United States Patent
Li et al.

(10) Patent No.: US 12,027,805 B2
(45) Date of Patent: Jul. 2, 2024

(54) POWER PLUG AND CONTROL CIRCUIT WITH INDICATOR LIGHT

(71) Applicant: Chengli Li, Suzhou (CN)

(72) Inventors: Chengli Li, Suzhou (CN); Xiaoming Zhang, Suzhou (CN); Fei Lin, Suzhou (CN)

(73) Assignee: Chengli Li, Suzhou (CN)

( * ) Notice: Subject to any disclaimer, the term of this patent is extended or adjusted under 35 U.S.C. 154(b) by 235 days.

(21) Appl. No.: 17/740,098

(22) Filed: May 9, 2022

(65) Prior Publication Data
US 2023/0361514 A1  Nov. 9, 2023

(30) Foreign Application Priority Data
May 6, 2022  (CN) .......................... 202221069629.8

(51) Int. Cl.
*H01R 13/71* (2006.01)
*H01R 13/713* (2006.01)
*H01R 13/717* (2006.01)

(52) U.S. Cl.
CPC ....... *H01R 13/713* (2013.01); *H01R 13/7175* (2013.01)

(58) Field of Classification Search
CPC .. H01R 13/713; H01R 13/7175; H01R 24/28; H01H 9/00; H01H 13/00; Y02B 20/30
See application file for complete search history.

(56) References Cited

U.S. PATENT DOCUMENTS

| 4,630,020 | A  | * | 12/1986 | Yang ...................... | H01H 71/04 337/79 |
| 10,770,844 | B2 | * | 9/2020 | Nie ..................... | H01R 13/5816 |
| 2006/0186984 | A1 | * | 8/2006 | Ullermann ............. | H01H 71/04 337/14 |
| 2018/0166242 | A1 | * | 6/2018 | Li ........................ | H01H 83/144 |

FOREIGN PATENT DOCUMENTS

CN  201490482  *  5/2010  ............. H01R 13/66

\* cited by examiner

*Primary Examiner* — Truc T Nguyen
(74) *Attorney, Agent, or Firm* — Chen Yoshimura LLP

(57) ABSTRACT

A power plug includes a shell, input insertion plates, output power lines, a push button on the shell, and a trip assembly inside the shell for controlling electrical coupling between the input insertion plates and output power lines. The trip assembly includes a light emitting element, electrical coupling terminals, and a drive member mechanically coupled to the push button and configured to, in response to a pressing of the push button, control electrical coupling of the electrical coupling terminals, which in turn controls the electrical coupling between the input insertion plates and output power lines. The drive member includes a reflective portion that reflects a part of the light from the light emitting element to the push button as an indicator light. The dual function drive member that accomplishes both mechanical coupling and light transmission reduces the number of components. A device with an electrical control circuit is also disclosed.

13 Claims, 6 Drawing Sheets

POWER PLUG AND CONTROL CIRCUIT WITH INDICATOR LIGHT

BACKGROUND OF THE INVENTION

Field of the Invention

This invention relates to devices with electrical control circuits, and in particular, it relates to a power plug with an indicator light.

Description of Related Art

Conventional electrical devices with control circuits often employ a light guiding rod to guide light emitted by an LED (light emitting diode) to an exterior surface of the electrical device, to function as an indicator. Take a power plug with leakage current detection interrupter (LCDI) as an example, when a button is pressed, the control circuit is made conductive, and the LED in the trip mechanism inside the plug emits light. Conventional LCDI devices often employ a light guiding rod inside the plug to guide light emitted by the LED to the exterior surface of the plug, to indicate the working state of the LCDI device.

SUMMARY

To reduce structural complexity of components and the overall device, and enhance the robustness of the device, embodiments of the present invention employ components of the plug that have other functions to also function as light guiding components, so that these components both serve their original functions and function to guide the light from the LED to the exterior surface of the device.

To achieve the above objects, embodiments of the present invention provide a power plug with an indicator light, where a drive member is configured to also serve as a light guiding component to transmit light emitted by an internal LED to the exterior surface of the device as an indicator light.

In one aspect, the present invention provides a power plug, which includes: a shell; input insertion plates; output power lines; a push button disposed on the shell; and a trip assembly disposed inside the shell, configured to control an electrical coupling between the input insertion plates and the output power lines, the trip assembly including: a light emitting element; electrical coupling terminals; and a drive member, mechanically coupled to the push button and configured to, in response to a pressing of the push button, control an electrical coupling of the electrical coupling terminals, which in turn controls the electrical coupling between the input insertion plates and the output power lines, the drive member including a reflective portion configured to reflect at least a part of a light, which is emitted by the light emitting element when the electrical coupling terminals are coupled, to the push button as an indicator light.

In such a power plug, when the push button is pressed, the light emitted by the light emitting element inside the plug is reflected by the reflective portion of the drive member to the push button to indicate the present working condition of the power plug. The drive member with the reflective portion performs dual functions of transmitting the mechanical drive force and transmitting the light. This simplifies the structure and reduces the number of components of the power plug.

In one embodiment, the drive member controls the electrical coupling terminals to establish the electrical coupling in response to the push button being pressed once, and the light emitting element is configured to emit light in response to the electrical coupling of the electrical coupling terminals.

In one embodiment, the drive member is configured to decouple the electrical coupling terminals in response to the trip assembly being tripped, and the light emitting element is configured to stop emitting light in response to the decoupling of the electrical coupling terminals.

In one embodiment, a portion of the drive member facing the light emitting element is formed of a light transmitting material to at least partially transmit the light emitted by the light emitting element.

In one embodiment, the push button includes a hole to accommodate a first end of the drive member.

In one embodiment, the push button is at least partially formed of a semitransparent material.

In one embodiment, the drive member includes a reset rod.

To reduce structural complexity, embodiments of the present invention also provide a device with an electrical control circuit and an indicator light, where a drive member is configured to also serve as a light guiding component to transmit light emitted by an internal light emitting element to the exterior surface of the device as an indicator light.

In another aspect, the present invention provides a device with an electrical control circuit, which includes: a shell; a push button disposed on the shell; and a trip assembly disposed inside the shell, configured to perform a control function, the trip assembly including: a light emitting element; electrical coupling components; and a drive member, mechanically coupled to the push button and configured to, in response to a pressing of the push button, control an electrical coupling of the electrical coupling components, which in turn accomplishes the control function, the drive member including a reflective portion configured to reflect at least a part of a light, which is emitted by the light emitting element when the electrical coupling components are coupled, to the push button as an indicator light.

In such a device with control circuit, when the push button is pressed, the light emitted by the light emitting element inside the device is reflected by the reflective portion of the drive member to the push button to indicate the present working condition of the device. The drive member with the reflective portion performs dual functions of transmitting the mechanical drive force and transmitting the light. This simplifies the structure and reduces the number of components of the device.

In one embodiment, the drive member controls the electrical coupling components to establish the electrical coupling in response to the push button being pressed once, and the light emitting element is configured to emit light in response to the electrical coupling of the electrical coupling components.

In one embodiment, the drive member is configured to decouple the electrical coupling components in response to the trip assembly being tripped, and the light emitting element is configured to stop emitting light in response to the decoupling of the electrical coupling components.

In one embodiment, a portion of the drive member facing the light emitting element is formed of a light transmitting material to at least partially transmit the light emitted by the light emitting element.

In one embodiment, the push button includes a hole to accommodate a first end of the drive member.

In one embodiment, the push button is at least partially formed of a semitransparent material.

BRIEF DESCRIPTION OF THE DRAWINGS

Preferred embodiments of the present invention are described with reference to the drawings.

DETAILED DESCRIPTION OF PREFERRED EMBODIMENTS

Preferred embodiments of the present and their applications are described below. It should be understood that these descriptions describe embodiments of the present invention but do not limit the scope of the invention. When describing the various components, directional terms such as "up," "down," "top," "bottom" etc. are not absolute but are relative. These terms may correspond to the views in the various illustrations, and can change when the views or the relative positions of the components change.

Figure 1:
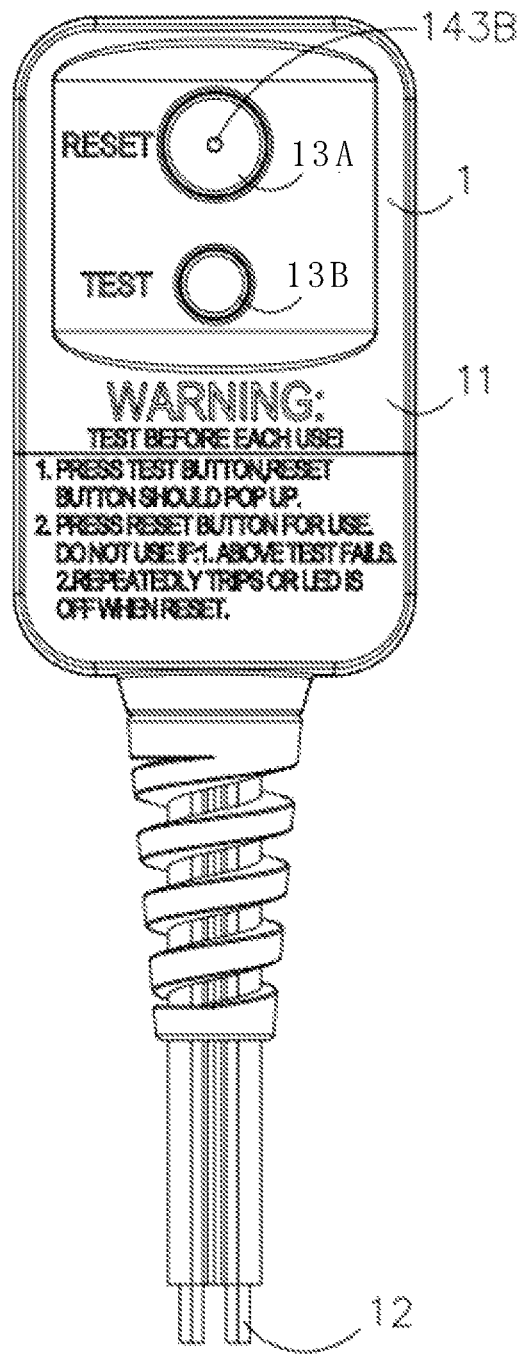
FIG. 1 is an exterior view of a power plug according to an embodiment of the present invention.

FIG. 1 is an exterior view of a power plug 1 according to an embodiment of the present invention. The power plug 1 includes a shell 11, insertion plates for power input (not shown), output power lines 12, a trip assembly disposed inside the shell 11, and a push button 13A disposed on the shell 11.

Figure 2:
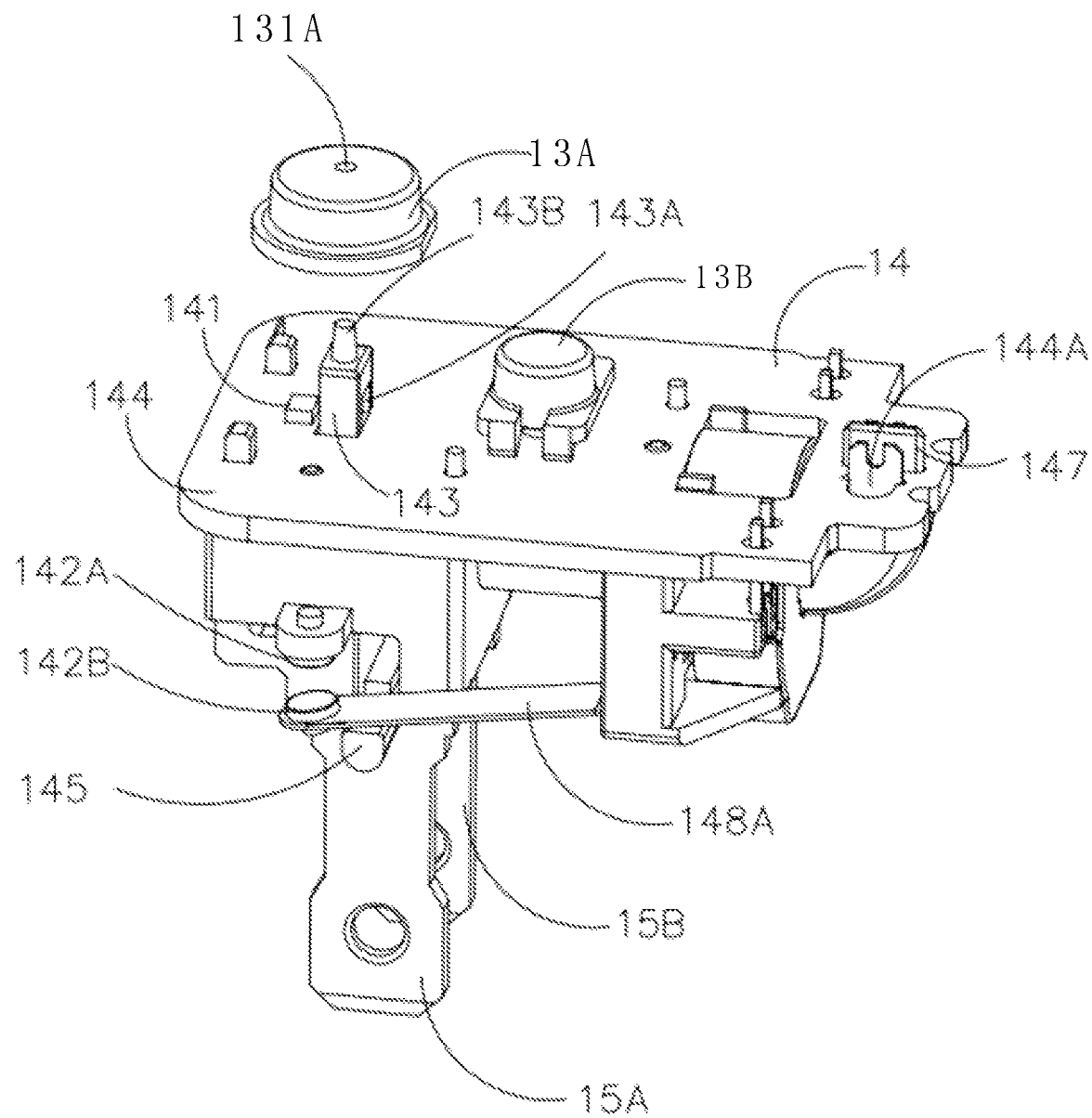
FIG. 2 illustrates the interior structure of the power plug of FIG. 1.
Figure 3:
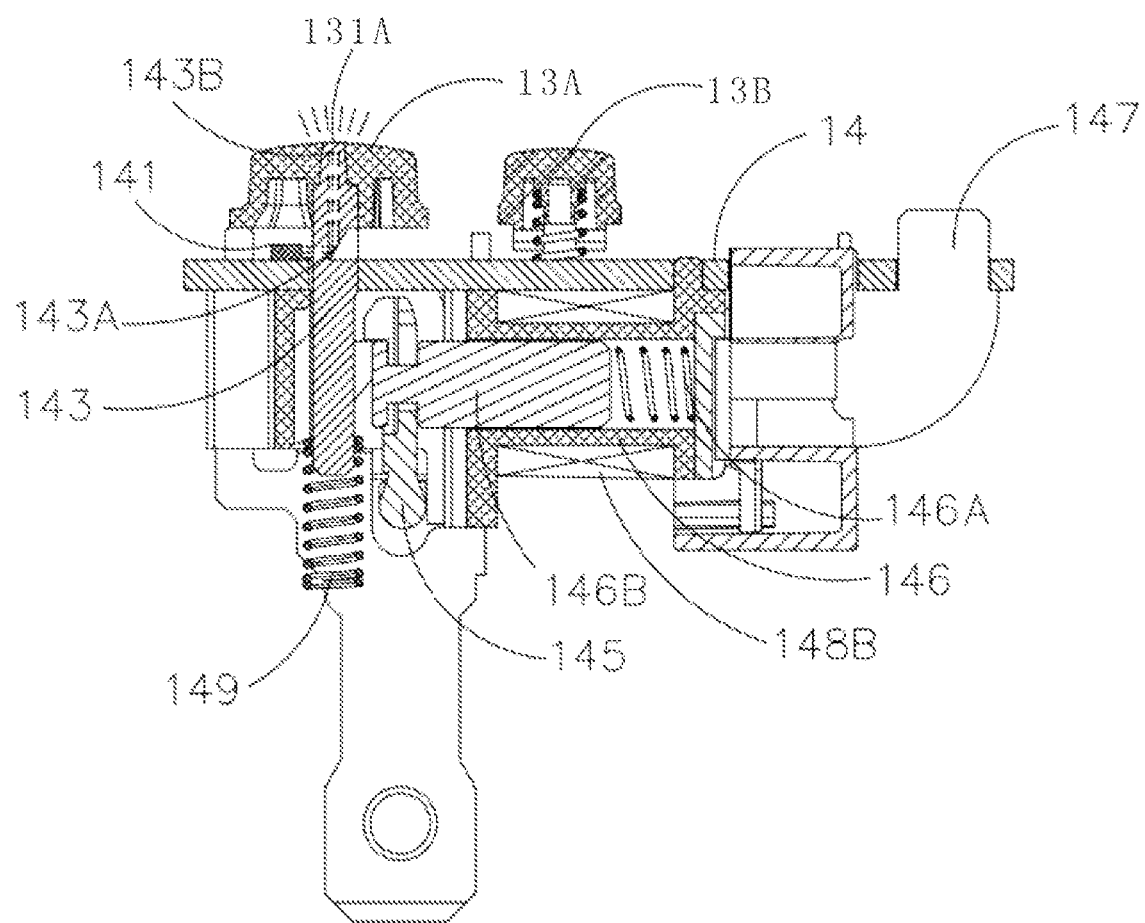
FIG. 3 is a cross-sectional view of the power plug of FIG. 1.

FIGS. 2 and 3 illustrate the trip assembly 14, input insertion plates 15A, 15B, and push button 13A of the power plug 1. The trip assembly 14 is configured to control an electrical connection between the input insertion plates 15A, 15B and output power lines 12. It includes a light emitting element 141, electrical coupling elements 142A, 142B, and a drive member 143. The drive member 143 is coupled to the button 13A, and is configured to, in response to the button 13A being manually pressed, control the electrical coupling elements 142A, 142B of the trip assembly 14 to couple to each other, thereby controlling the electrical connection between the input insertion plates 15A, 15B and the output power lines 12. The drive member 143 includes a reflective element 143A, configured to, when the electrical coupling elements 142A, 142B are electrically coupled to each other, reflect at least a part of the light emitted by the light emitting element 141 to the button 13A as an indicator.

For example, similar to a typical conventional power plug, the drive member 143 is configured to cause the electrical coupling elements 142A, 142B to be coupled to each other in response to the button 13A being pressed once. The coupling of the electrical coupling elements 142A, 142B causes the electrical circuit connected to the light emitting element 141 to become conductive, so the light emitting element 141 emits light. Further, the drive member 143 is configured to decouple the electrical coupling elements 142A, 142B from each other when the device is tripped (which causes the button 13A to be released). The decoupling of the electrical coupling elements 142A, 142B causes the electrical circuit connected to the light emitting element 141 to be an open circuit, so the light emitting element 141 stops emitting light.

The above described structure may be used in any suitable power plugs with an indicator. The structures of the LCDI power plugs in the illustrated embodiments are described in more detail below.

Still referring to FIGS. 2 and 3, here, the push button 13A is a reset button. The power plug further includes a test button 13B, also disposed on the shell 11. The drive member 143 is a reset rod coupled to the reset button 13A. The light emitting element 141 may be an LED chip. The trip assembly 14 includes the reset rod 143, a circuit board 144 including the LED 141, a push bar 145, a trip solenoid (SOL) assembly 146, detection coil (CT) assembly 147, neutral (N) moving contact arm 148A and hot (L) moving contact arm 148B, neutral stationary contact terminal 142A and hot stationary contact terminal (not shown), and reset spring 149. The reset rod 143 is provided with a first hook (not shown), and the push bar 145 is provided with a corresponding second hook (not shown). The trip solenoid assembly 146 includes a trip spring 146A and trip plunger 146B. The input insertion plates include two insertion plates 15A and 15B, which are preferably respectively formed integrally with the neutral stationary contact terminal 142A and hot stationary contact terminal (not shown). The output power lines 12 include a neutral line N and a hot line L, respectively coupled to the neutral moving contact arm 148A and line moving contact arm 148B via neutral line solder slot 144A and hot line solder slot (not shown). The neutral moving contact arm 148A and hot moving contact arm 148B respectively carry the neutral moving contact terminal 142B and hot moving contact terminal (not shown). The coupling of the electrical coupling elements described earlier corresponds to the contact of the moving contact terminal e.g. 142B and the stationary contact terminal e.g. 142A in this example. By the contact or separation of the neutral moving contact terminal 142B with the neutral stationary contact terminal 142A, and of the hot moving contact terminal with the hot stationary contact terminal, the N and L output power lines 12 are respectively connected to or disconnected from the N and L input insertion plates 15A, 15B.

After the power plug is plugged into a power outlet receptacle, before the reset button 13A is pressed down, the neutral moving contact terminal 142B and the hot moving contact terminal are respectively separated from the neutral stationary contact terminal 142A and hot stationary contact terminal, and no power is output to the output power lines 12. When the reset button 13A is pressed down, the reset rod 143 is pressed by the reset button 13A to move downwards, such that the first hook of the reset rod 143 and the second hook of the push bar 145 engage with each other and remain engaged. Immediately thereafter, the reset spring 149 springs back upward after it is pressed downwards by the reset rod 143, causing the reset rod 143 and the push bar 145 engaged with it to be pushed upwards. The push bar 145 brings the neutral moving contact arm 148A and hot moving contact arm 148B to move upwards, eventually causing the neutral moving contact terminal 142B and the hot moving contact terminal to respectively contact the neutral stationary contact terminal 142A and the hot stationary contact terminal. As a result, the output power lines 12 is electrically connected to the input insertion plates 15A, 15B; the electrical circuit on the circuit board 144 of the trip assembly 14 is energized, and the light emitting element 141 turns on.

The internal state of the power plug 1 after the reset button 13A is pressed down is shown in FIG. 3. The light emitting element 141 on the circuit board 144 is disposed on a side of the reset rod 143. A reflective element 143A is provided inside the reset rod 143. The part of the reset rod 143 facing the LED 141 is formed of a light transmitting material. The light emitted by the light emitting element 141 passes through this part to reach the reflective element 143A, and is reflected by the reflective element 143A to the reset button 13A, so as to indicate the working condition of the power plug 1. Preferably, the reflective element 143A of the reset rod 143 may be implemented by coating a part of the reset rod 143 with a reflective material, or by providing a discrete reflective element, or forming the reflective element 143A integrally using injection molding. The reset rod 143 is not limited to have only one reflective element 143A; it may include multiple reflective elements to guide the light from the light emitting element 141 to the reset button 13A. Alternatively, the part of the reset rod 143 facing the LED 141 may be hollow to allow the light from the light emitting element 141 to reach the reflective element 143A. Preferably, the LED may be an edge-emitting device, so that when it is soldered to the circuit board 144, the emitted light is parallel to the circuit board 144, achieving better illumination effect for the reset button 13A.

Still referring to FIGS. 1, 2 and 3, in one embodiment, the reset button 13A has a hole 131A configured to accommodate a first end 143B of the reset rod 143 closer to the reset button 13A. When the LED 141 is on, a part of the light from it eventually reaches the first end 143B of the reset rod 143, and the reset button 13A is illuminated by the first end 143 that passes through it. The illumination indicates that the internal circuit of the power plug 1 is connected to the power source. Preferably, the first end 143B of the reset rod 143 may be formed into a ball shape with a relatively thin wall, so that the light can more easily pass through the first end 143B.

Figure 4:
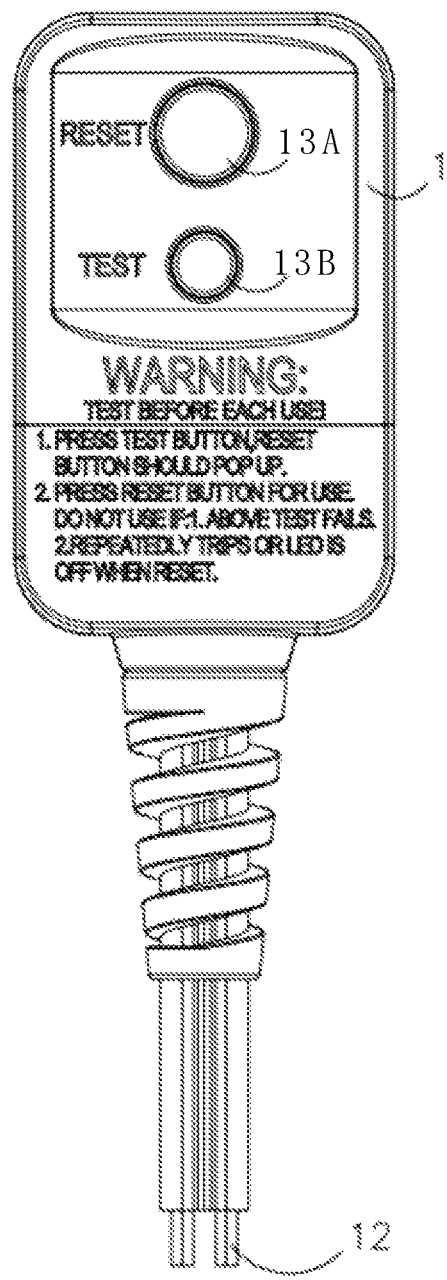
FIG. 4 is an exterior view of a power plug according to another embodiment of the present invention.
Figure 5:
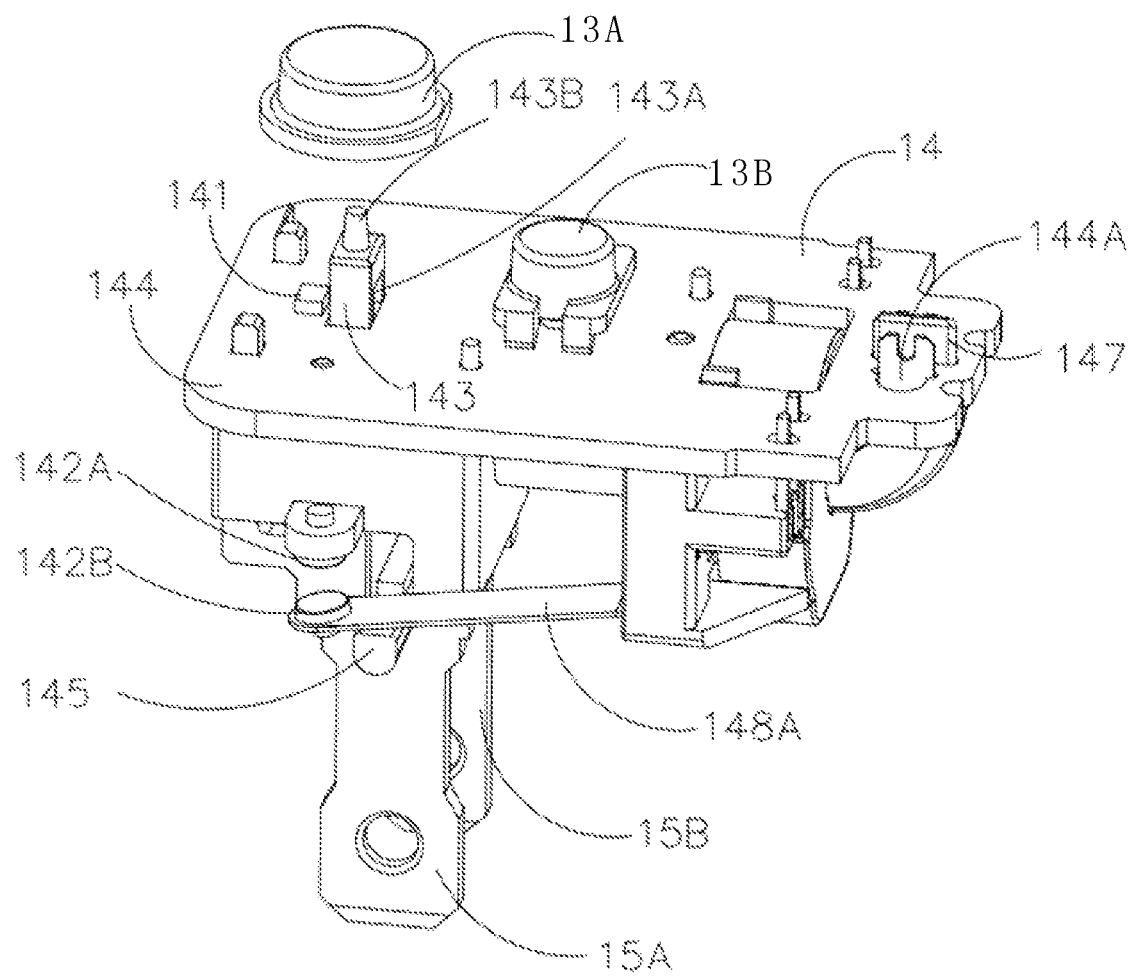
FIG. 5 illustrates the interior structure of the power plug of FIG. 4.
Figure 6:
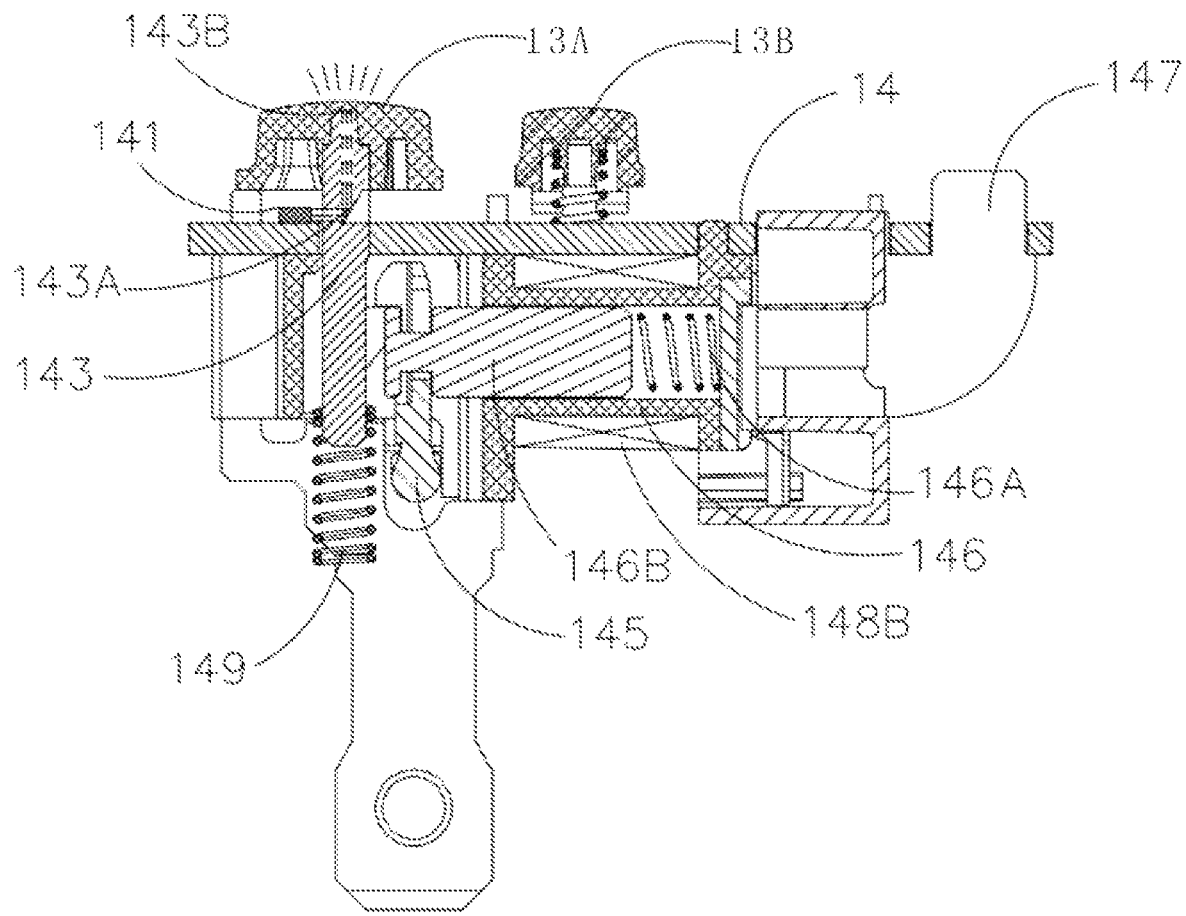
FIG. 6 is a cross-sectional view of the power plug of FIG. 4.

In another embodiment, the reset button 13A is at least partly formed of a semitransparent material. Referring to FIGS. 4, 5, and 6, when the LED 141 is turned on, a part of its light eventually reaches the first end 143B of the reset rod 143. The light passes through the first end 143B and through the reset button 13A, which is formed of a relatively thin, light colored and semitransparent material. Thus, the reset button 13A is illuminated to indicate that the internal circuit of the power plug 1 is connected to the power source. The structure of the power plug 1 shown in FIGS. 4, 5, and 6 is otherwise the same or similar to that shown in FIGS. 1, 2 and 3.

When a current leakage occurs in the power plug 1, or when the test button 13B is pressed down during normal operation, a real or simulated leakage current flows in the circuit board 144. This current signal is processed by the circuit board 144, resulting in the trip solenoid assembly 146 being energized. Consequently, the trip plunger 146B moves horizontally to the right, bringing the push bar 145 to move with it to the right and be separated from the reset rod 143. The reset rod 143 moves upwards under the force of the reset spring 149, pushing the reset button 13A and causing it to jump up. Meanwhile, the neutral moving contact terminal 142B and the hot moving contact terminal fall back down, separating from the neutral stationary contact terminal 142A and hot stationary contact terminal. This disconnects the power to the output and the internal components of the trip assembly 14, and the light emitting element 141 stops emitting light.

In the above descriptions, the power plug 1 is a two-prong plug with a hot line and a neutral line. In other embodiments, the plug may be a three-prong plug with a hot line, a neutral line, and a ground line.

In the LCDI power plug 1 according to embodiments of the present invention, the reset button 13A presses down the reset rod 143 to control the electrical coupling in the trip assembly 14, which turns on the indicator light to indicate the present working condition of the power plug. The reset rod 143 or a similar drive member is an indispensable component of the trip assembly 14. Conventional power plugs typically employs a separate and dedicated light guiding component to transmit the light of the LED to the exterior surface of the power plug. In embodiments of the present invention, on the other hand, the drive member such as the reset rod 143 is designed to function as a light guide, eliminating the need for a separate and dedicated component. This reduces the number of components, simplifies the structure, and improves the robustness of the power plug.

In the descriptions above, the drive member with a reflective portion is applied in a power plug. Those of ordinary skill in the art will be able to apply similar designs in other suitable devices with control electrical circuits, such as home appliances or industrial equipment with indicator lights. Such a device includes at least a shell, a push button disposed on the shell, and a trip assembly disposed inside the shell configured to perform a control function. The trip assembly includes a light emitting element, electrical coupling components, and a drive member coupled to the push button. In response to the pressing of the push button, the drive member controls the coupling of the electrical coupling components to achieve the control function of the device. When the electrical coupling components are coupled to each other, the light emitting element emits light, and a portion of the light is reflected by a reflective portion of the drive member to the push button as an indicator light. Similar to the power plug described above, the drive member accomplishes the coupling of the electrical coupling components in response to a push of the push button, and the light emitting element emits light in response to the coupling of the electrical coupling components. Further, the drive member decouples the electrical coupling components when the trip assembly is tripped, and the light emitting element stops emitting light in response to the decoupling.

When the electrical coupling components are coupled to each other, the light from the light emitting element passes through a portion of the drive member facing the light emitting element, and is reflected by the reflective portion of the drive member to a first end of the drive member near the push button. The portion of the drive member facing the light emitting element is made of a light transmitting material to allow the light to pass through. In one embodiment, the push button includes a hole to accommodate the first end of the drive member. In another embodiment, the push button is at least partially formed of a semitransparent material.

A device having suitable control circuit with indicator function may employ the above described structures, where the drive member has a dual function of transmitting the mechanical action of the push button and transmitting the light generated by the internal light emitting element, so as to reduce the number of components of the device.

While the present invention is described above using specific examples, these examples are only illustrative and do not limit the scope of the invention. It will be apparent to those skilled in the art that various modifications, additions and deletions can be made to the power plug device of the present invention without departing from the spirit or scope of the invention.

What is claimed is:

1. A power plug, comprising:
   a shell;
   input insertion plates extending from the shell;
   output power lines extending from the shell;
   a push button disposed on the shell; and
   a trip assembly disposed inside the shell, configured to control an electrical coupling between the input insertion plates and the output power lines, the trip assembly including:
   a light emitting element;
   electrical coupling elements; and
   a drive member, mechanically coupled to the push button and configured to, in response to a pressing of the push button, control an electrical coupling of the electrical coupling elements, which in turn controls the electrical coupling between the input insertion plates and the output power lines, the drive member including a reflective portion configured to reflect at least a part of a light, which is emitted by the light emitting element when the electrical coupling elements are coupled, to the push button as an indicator light.

2. The power plug of claim 1, wherein the drive member controls the electrical coupling elements to establish the electrical coupling in response to the push button being pressed once, and the light emitting element is configured to emit light in response to the electrical coupling of the electrical coupling elements.

3. The power plug of claim 2, wherein the drive member is configured to decouple the electrical coupling elements in response to the trip assembly being tripped, and the light emitting element is configured to stop emitting light in response to the decoupling of the electrical coupling elements.

4. The power plug of claim 1, wherein a portion of the drive member facing the light emitting element is formed of a light transmitting material to at least partially transmit the light emitted by the light emitting element.

5. The power plug of claim 1, wherein the push button includes a hole to accommodate a first end of the drive member.

6. The power plug of claim 1, wherein the push button is at least partially formed of a semitransparent material.

7. The power plug of claim 1, wherein the drive member includes a reset rod.

8. A device with an electrical control circuit, comprising:
   a shell;
   a push button disposed on the shell; and
   a trip assembly disposed inside the shell, configured to perform a control function, the trip assembly including:
   a light emitting element;
   electrical coupling components; and
   a drive member, mechanically coupled to the push button and configured to, in response to a pressing of the push button, control an electrical coupling of the electrical coupling components, which in turn accomplishes the control function, the drive member including a reflective portion configured to reflect at least a part of a light, which is emitted by the light emitting element when the electrical coupling components are coupled, to the push button as an indicator light.

9. The device of claim 8, wherein the drive member controls the electrical coupling components to establish the electrical coupling in response to the push button being pressed once, and the light emitting element is configured to emit light in response to the electrical coupling of the electrical coupling components.

10. The device of claim 9, wherein the drive member is configured to decouple the electrical coupling components in response to the trip assembly being tripped, and the light emitting element is configured to stop emitting light in response to the decoupling of the electrical coupling components.

11. The device of claim 8, wherein a portion of the drive member facing the light emitting element is formed of a light transmitting material to at least partially transmit the light emitted by the light emitting element.

12. The device of claim 8, wherein the push button includes a hole to accommodate a first end of the drive member.

13. The device of claim 8, wherein the push button is at least partially formed of a semitransparent material.

* * * * *